United States Patent Office 3,489,583
Patented Jan. 13, 1970

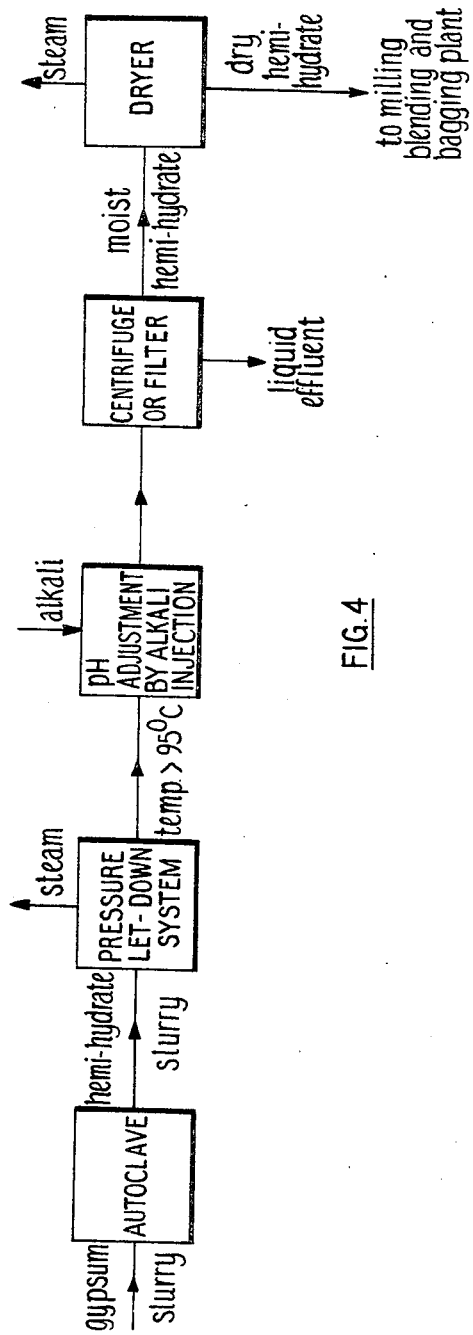

3,489,583
STABILIZATION OF CALCIUM SULPHATE
ALPHA HEMI-HYDRATE SLURRY
Martin S. Bloom and Martin Granger Brown, Norton-on-Tees, England, assignors to Imperial Chemical Industries Limited, London, England, a corporation of Great Britain
Continuation of application Ser. No. 434,039, Feb. 19, 1965. This application Jan. 6, 1969, Ser. No. 791,207
Claims priority, application Great Britain, Feb. 24, 1964, 7,576/65
Int. Cl. C04b 11/00
U.S. Cl. 106—110                                          6 Claims

ABSTRACT OF THE DISCLOSURE

Calcium sulfate α-hemihydrate is made from by-product gypsum from a phosphoric acid manufacturing operation by heating a slurry of the gypsum. Calcium hydroxide is added to the resulting slurry to retard hydration time. Just before casting of the slurry its hydration time is accelerated by adding sulfuric acid.

This application is a continuation of Ser. No. 434,039 dated Feb. 19, 1965, now abandoned.

The present invention relates to the production of calcium sulphate alpha-hemi-hydrate from gypsum. The invention is particularly, though not exclusively, applicable to a continuous process for the manufacture of calcium sulphate alpha-hemi-hydrate for casting plaster panels and for the manufacture of plasterboard and building plaster from wet gypsum recovered from some other industrial process such as, for example, the manufacture of phosphoric acid from phosphate rock.

In our co-pending United States application, Ser. No. 414,424, filed Nov. 27, 1964, now Patent No. 3,370,058, we have described a process for the continuous production of calcium sulphate alpha-hemi-hydrate from gypsum which comprises the steps of continuously passing a slurry of gypsum and water at superatmospheric pressure into and through a reactor having an inlet and an outlet, agitating said gypsum slurry in the reactor at a temperature above 100° C., and continuously withdrawing calcium sulphate alpha-hemi-hydrate slurry from the outlet of the reactor without reducing the pressure therein. Upon withdrawal from the reactor, the slurry, which is now at atmospheric pressure, may be for example at a temperature of the order of 95° C. or higher and, if the gypsum starting material was a by-product from the manufacture of phosphoric acid from phosphate rock, may be for example at a pH value between about 1 and 6.

Figure 1:
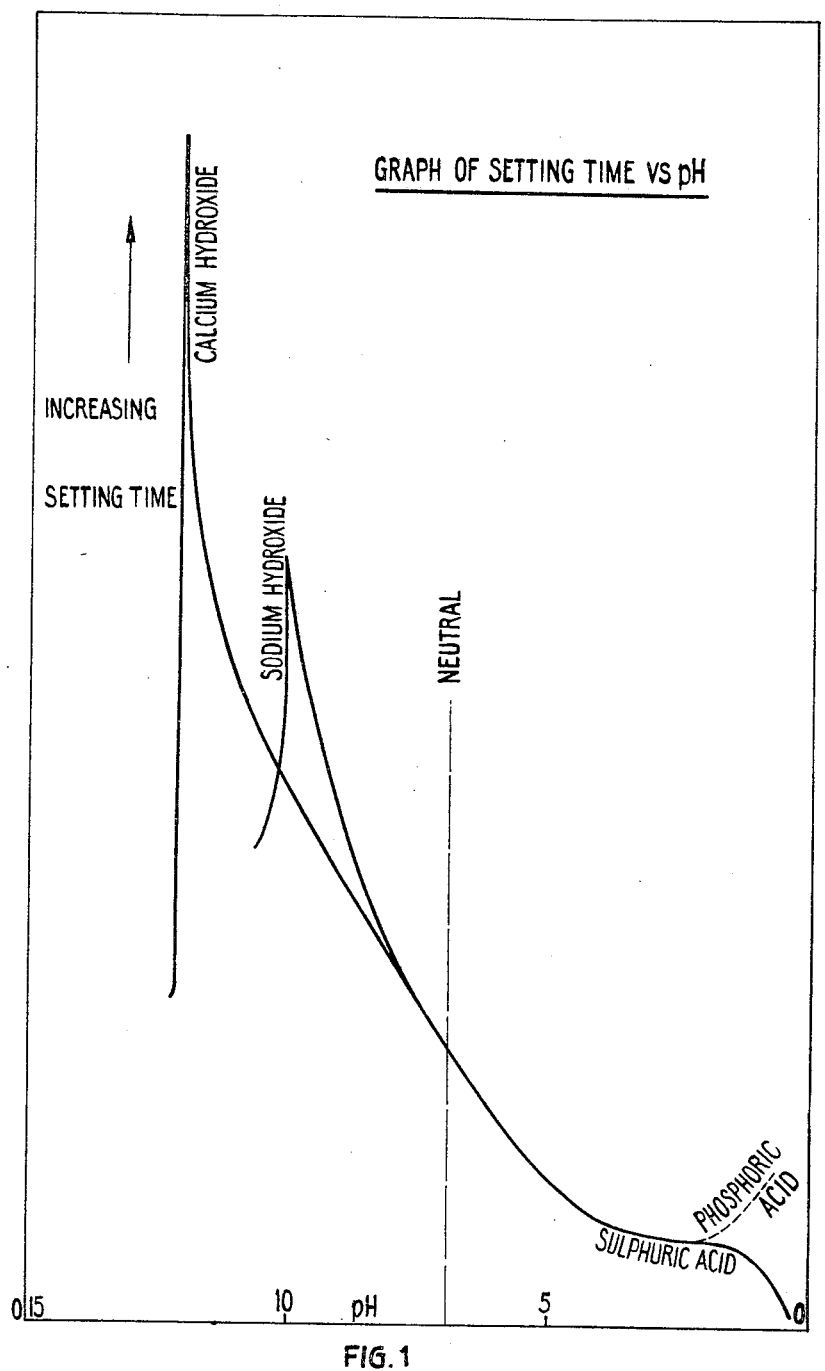
Figure 2:
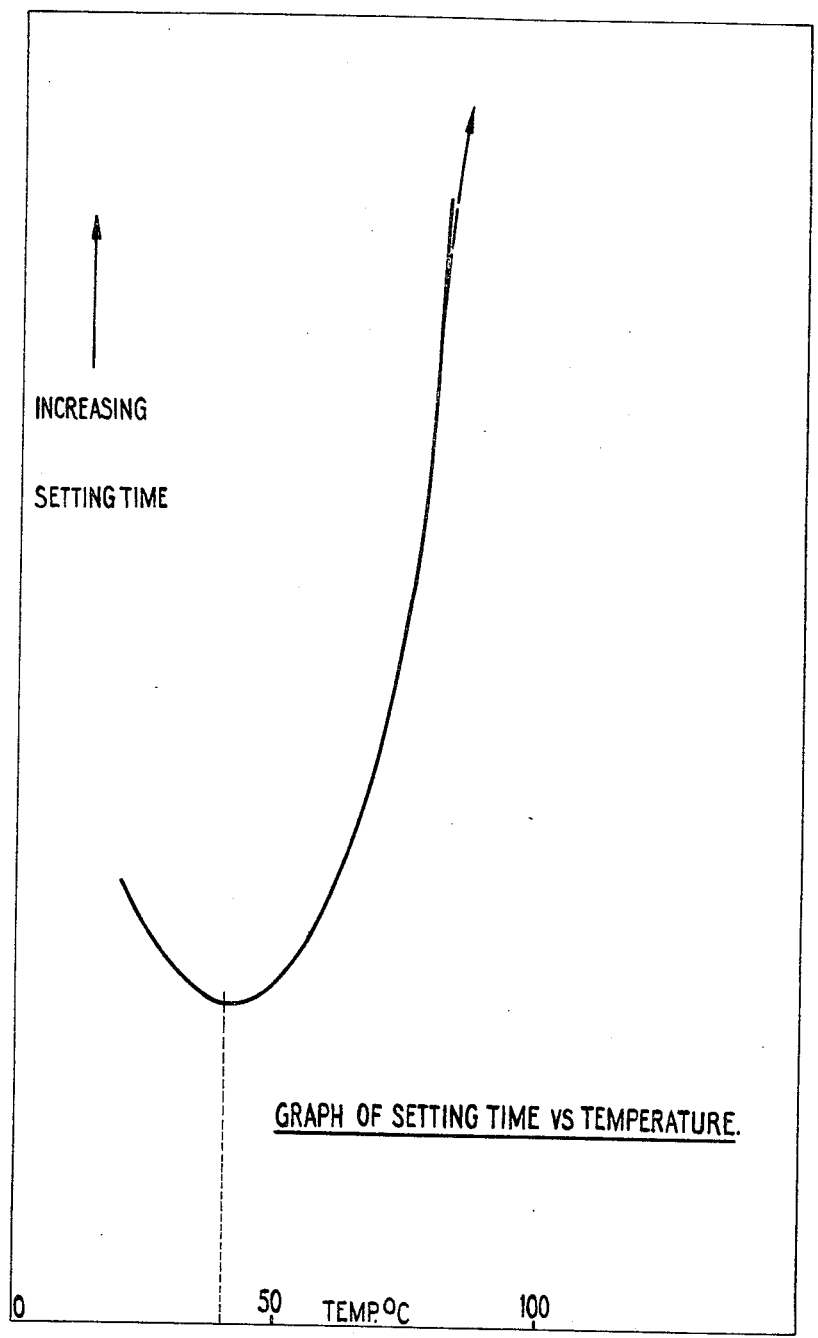

It has now been found that the setting time of alpha-hemi-hydrate slurry is dependent upon its pH value and temperature; for example, in one series of experiments it was found to be in accordance with the curves shown in FIGS. 1 and 2 of the accompanying drawings, in which its setting time is plotted against its pH value and its temperature respectively. From the curves, it will be seen that the slurry sets more rapidly when acid, for example at a pH of about 2, but that its setting time can be very considerably prolonged by making it more alkaline, and that whereas it sets most rapidly between about 30° C. and 50° C. it can be kept in the liquid state almost indefinitely at a temperature of about 95° C. or 97° C. Thus, while handling the slurry, it is theoretically most advantageous to maintain it alkaline, as in FIG. 1, and at a temperature in the neighbourhood of 97° C., and when rapid setting is required to reduce its pH and temperature to about 2.0 and 40° C. respectively. Intermediate setting times can be obtained by reducing the pH while maintaining the temperature, or vice versa, or by partially reducing both to a predetermined extent. Reduction of its temperature to below about 60° C. while the slurry is still being handled, may permit hydration to occur during handling.

The present invention accordingly provides a process for the preparation of calcium sulphate α-hemihydrate plaster which includes the steps of converting a slurry of gypsum and water to calcium sulphate α-hemihydrate, maintaining the resulting alpha-hemihydrate slurry at a temperature above about 60° C., raising the pH of the alpha-hemihydrate slurry to a value at which, at said temperature, hydration is substantially retarded, and maintaining the slurry in the liquid state at or above the said temperature and at or above the said pH value until it is required for use. Preferably the temperature of the alpha-hemi-hydrate slurry is maintained at or above about 95° C., and its pH is raised to above about 4.5, for example, by the simple addition of an alkali, such as milk of lime, before and/or after said conversion.

In one embodiment of the invention, hot alpha-hemihydrate slurry (after reduction of its water content, if necessary) is cooled to below 60° C., its pH reduced, for example by the addition of sulphuric acid, and delivered directly to casting mould or plasterboard plant.

In another embodiment of the invention, hot alpha-hemi-hydrate slurry at an appropriate pH (after mechanical reduction of its water content, if necessary) is dried at above 80° C. and subsequently milled.

Figure 3:
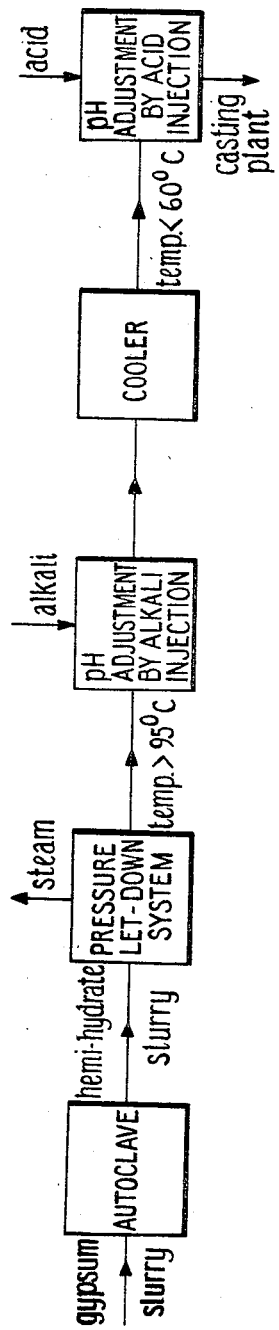

A suitable slurry for casting plaster panels can be obtained by autoclaving a slurry of gypsum and water as described in our co-pending British patent application No. 47,675/63, and is processed as shown in the flow sheet in FIG. 3 of the accompanying drawings. The gypsum, if obtained as a by-product in the manufacture of phosphoric acid from phosphate rock, will probably be at a pH below about 5.5. The slurry, of suitable consistency and with or without addition of crystal habit modifiers, is autoclaved continuously at a temperature of about 150° C. and at a pressure of about 4 atmospheres; the gypsum is rapidly converted into small needle crystals of calcium sulphate α-hemihydrate, and the hemihydrate slurry is withdrawn continuously from the autoclave through a pressure let-down system into a vessel fitted with a stirrer in which it is maintained at atmospheric pressure and a temperature of about 95° C. and its pH adjusted by the addition of a suitable alkali, for example calcium hydroxide or sodium hydroxide. The slurry is drawn off from the vessel, and cooled to about 50° C. by running it over or through a cooler; thereafter sufficient acid, for example, sulphuric or phosphoric acid, is added to reduce its pH to within the range 1 to 6. The slurry is run into moulds for the panels where it is allowed to set.

A slurry for use in the manufacture of plasterboard may be made in similar fashion and delivered directly to a plasterboard plant. To render the slurry of suitable consistency for this purpose, its water content may be reduced by centrifuging, preferably after the addition of the alkali and before the cooling stage.

While all the individual steps of the process, viz. autoclaving, addition of alkali, centrifuging (if any), cooling and acidification may be carried out as separate batch processes, it is preferred to link them into a single continuous process wherein wet gypsum waste is introduced into one end of the plant, and an alpha-hemihydrate slurry of the required consistency, temperature and pH is continuously delivered from the other end of the plant directly to panel moulds or to a plasterboard plant.

In the manufacture of building plaster, as shown in the flow sheet of FIG. 4 of the accompanying drawings, the slurry is withdrawn from the autoclave through a pressure let-down system into a vessel fitted with a stirrer, and only sufficient alkali is added to bring the slurry to a pH not exceeding 7.0 to give a non-alkaline building plaster with stable setting characteristics. To avoid premature setting of the slurry at this pH value, it is therefore preferably maintained at a temperature of the order of 95° C. while in the stirring vessel. From the stirring vessel, it is delivered, at the same pH and temperature, to a centrifuge or filter which reduces its water content and thence, successively, to a drying machine, for example a pneumatic drier or thermal screw, and to a milling, blending and bagging plant. As in the case of the manufacture of plaster panels or plasterboard, this process for the manufacture of building plaster may be carried out batch-wise, but is preferably a continuous process.

We claim:

1. In a process for the conversion of a slurry of by-product gypsum to a slurry of calcium sulphate hemihydrate and casting the α-hemihydrate into forms, the improvement which comprises;
   stabilizing the hemihydrate slurry until required for use by adding calcium hydroxide to raise the pH above 6 and maintaining the temperature above 60° C.
   and subsequently cooling the slurry and reducing the pH to 1–4.5 prior to casting.

2. A process as in claim 1 wherein said α-hemihydrate slurry is maintained at a temperature above about 95° C. prior to cooling.

3. A process as in claim 1 wherein the pH of said slurry is reduced to about 2.0 by said addition of acid.

4. A process as in claim 1 wherein said α-hemihydrate is formed at a temperature of above 100° C.

5. A process as in claim 1 wherein said by-product gypsum is a by-product from the manufacture of phosphoric acid from phosphate rock.

6. A process as in claim 1 wherein said step of forming said α-hemihydrate comprises continuously passing a slurry of gypsum and water at superatmospheric pressure into and through a reactor having an inlet and an outlet, agitating said gypsum slurry in the reactor at a temperature above 100° C., and continuously withdrawing calcium sulphate α-hemihydrate slurry from the outlet of the reactor without reducing the pressure therein.

References Cited

UNITED STATES PATENTS

| | | | |
|---|---|---|---|
| 1,672,638 | 6/1928 | Chassevent | 106—110 |
| 2,292,616 | 8/1942 | Dailey | 106—115 X |
| 3,199,997 | 8/1965 | Johnson | 106—110 |

FOREIGN PATENTS

| | | |
|---|---|---|
| 445,983 | 1/1948 | Canada. |
| 697,117 | 11/1964 | Canada. |

OSCAR R. VERTIZ, Primary Examiner

G. O. PETERS, Assistant Examiner

U.S. Cl. X.R.

23—122; 106—109